(12) United States Patent
Yang et al.

(10) Patent No.: US 11,749,029 B2
(45) Date of Patent: Sep. 5, 2023

(54) GESTURE LANGUAGE RECOGNITION METHOD AND APPARATUS, COMPUTER-READABLE STORAGE MEDIUM, AND COMPUTER DEVICE

(71) Applicant: TENCENT TECHNOLOGY (SHENZHEN) COMPANY LIMITED, Guangdong (CN)

(72) Inventors: Zhaoyang Yang, Shenzhen (CN); Xiaoyong Shen, Shenzhen (CN); Yuwing Tai, Shenzhen (CN); Jiaya Jia, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 172 days.

(21) Appl. No.: 17/463,301

(22) Filed: Aug. 31, 2021

(65) Prior Publication Data
US 2021/0390289 A1 Dec. 16, 2021

Related U.S. Application Data

(63) Continuation of application No. PCT/CN2020/098104, filed on Jun. 24, 2020.

(30) Foreign Application Priority Data

Jul. 18, 2019 (CN) .......................... 201910650159.0

(51) Int. Cl.
*G06K 9/00* (2022.01)
*G06V 40/20* (2022.01)
(Continued)

(52) U.S. Cl.
CPC ............ *G06V 40/28* (2022.01); *G06F 18/253* (2023.01); *G06N 3/04* (2013.01); *G06V 10/454* (2022.01);
(Continued)

(58) Field of Classification Search
CPC .... G06V 40/28; G06V 10/454; G06V 10/806; G06V 10/82; G06V 20/44; G06V 20/46;
(Continued)

(56) References Cited

U.S. PATENT DOCUMENTS

| 5,982,853 A | 11/1999 | Liebermann |
| 2016/0307469 A1* | 10/2016 | Zhou .................... G09B 21/009 |
| 2020/0143171 A1* | 5/2020 | Lee ......................... G06V 20/49 |

FOREIGN PATENT DOCUMENTS

| CN | 103376895 A | 10/2013 |
| CN | 104463250 A | 3/2015 |

(Continued)

OTHER PUBLICATIONS

Supplementary European Search Report dated Aug. 11, 2022 in Application No. 20841016.7, 9 pages.
(Continued)

*Primary Examiner* — Dhaval V Patel
(74) *Attorney, Agent, or Firm* — ARENTFOX SCHIFF LLP

(57) ABSTRACT

A gesture language recognition method is provided. In the method, a first video is obtained. Gesture features are extracted from frames of images in the first video. Gesture change features are extracted from the frames of the images in the first video. Gesture language word information is extracted from fused features that are determined based on the gesture features and the gesture change features. The gesture language word information is combined into a gesture language sentence according to context information corresponding to the gesture language word information.

20 Claims, 8 Drawing Sheets

(51) Int. Cl.
*G06N 3/04* (2023.01)
*G06V 20/40* (2022.01)
*G06V 40/16* (2022.01)
*G06F 18/25* (2023.01)
*G06V 10/80* (2022.01)
*G06V 10/82* (2022.01)
*G06V 10/44* (2022.01)

(52) U.S. Cl.
CPC ............ *G06V 10/806* (2022.01); *G06V 10/82* (2022.01); *G06V 20/44* (2022.01); *G06V 20/46* (2022.01); *G06V 20/49* (2022.01); *G06V 40/168* (2022.01); *G06V 40/171* (2022.01)

(58) Field of Classification Search
CPC .... G06V 20/49; G06V 40/168; G06V 40/171; G06F 18/253; G06N 3/04; G06N 3/044; G06N 3/045; G06N 3/08
See application file for complete search history.

(56) References Cited

FOREIGN PATENT DOCUMENTS

| | | |
|---|---|---|
| CN | 106295464 A | 1/2017 |
| CN | 107247702 A | 10/2017 |
| CN | 108171198 A | 6/2018 |
| CN | 108256458 A | 7/2018 |
| CN | 108615009 A | 10/2018 |
| CN | 108647603 A | 10/2018 |
| CN | 109063615 A | 12/2018 |
| CN | 109190578 A | 1/2019 |
| CN | 109344288 A | 2/2019 |
| CN | 109656358 A | 4/2019 |
| CN | 109766559 A | 5/2019 |
| CN | 109801268 A | 5/2019 |
| CN | 109829509 A | 5/2019 |
| CN | 109977773 A | 7/2019 |
| CN | 109993130 A | 7/2019 |
| CN | 110348420 A | 10/2019 |

OTHER PUBLICATIONS

Zhu Guangming et al: "Continuous Gesture Segmentation and Recognition Using 3DCNN and Convolutional LSTM", IEEE Transactions On Multimedia, IEEE, USA, vol. 21, No. 4, Apr. 1, 2019, pp. 1011-1021.
International Search Report Issued in Application PCT/CN2020/098104 dated Sep. 24, 2020, with English Translation, (5 pages).
Written Opinion Issued in Application in Application PCT/CN2020/098104 dated Sep. 24, 2020 (4 pages).
Chinese Office Action Issued in Application CN201910650159.0 dated Jan. 4, 2021, with English Concise Translation, (20 pages).
Guixia Song, "Data Analysis of Sign Language and Generation Technology", Chinese Master's Theses Full-text Database Information Science and Technology, Issue No. 2 (4 pages).
Shuo Wang et al., "Connectionist Temporal Fusion for Sign Language Translation", MM"18 (9 pages).
Jie Huang, "Deep Learning Based Sign Language Recognition", China Doctoral Dissertations Full-text Database Information Science and Technology (3 pages).

* cited by examiner

| Input layer | | |
|---|---|---|
| Two-dimensional convolution network (7×7, 2, 64) | Three-dimensional convolution network (3×7×7, 2, 64) | First feature extraction unit |
| Two-dimensional convolution network (1×1, 1, 64) | | |
| Max pooling layer (2×2, 2) | | |
| Two-dimensional convolution network (3×3, 1, 128) | Three-dimensional convolution network (3×3×3, 1, 128) | Second feature extraction unit |
| Two-dimensional convolution network (1×1, 1, 128) | | |
| Max pooling layer (2×2, 2) | | |
| Two-dimensional convolution network (3×3, 1, 256) | Three-dimensional convolution network (3×3×3, 1, 256) | Third feature extraction unit |
| Two-dimensional convolution network (1×1, 1, 256) | | |
| Max pooling layer (2×2, 2) | | |
| Two-dimensional convolution network (3×3, 1, 512) | Three-dimensional convolution network (3×3×3, 1, 512) | Fourth feature extraction unit |
| Two-dimensional convolution network (1×1, 1, 512) | | |
| Global average pooling layer | | |

FIG. 6

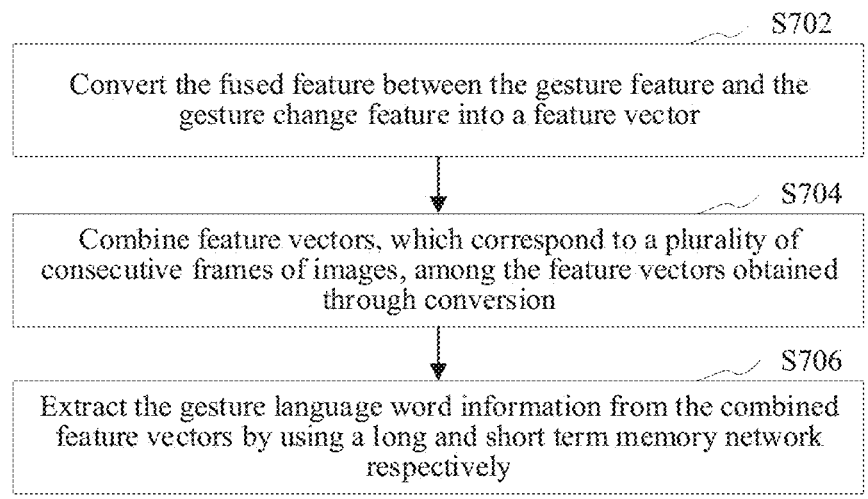

FIG. 7

GESTURE LANGUAGE RECOGNITION METHOD AND APPARATUS, COMPUTER-READABLE STORAGE MEDIUM, AND COMPUTER DEVICE

RELATED APPLICATIONS

This application is a continuation of International Application No. PCT/CN2020/098104, entitled "SIGN LANGUAGE RECOGNITION METHOD AND APPARATUS, COMPUTER-READABLE STORAGE MEDIUM, AND COMPUTER DEVICE" and filed on Jun. 24, 2020, which claims priority to Chinese Patent Application No. 201910650159.0, entitled "GESTURE LANGUAGE RECOGNITION METHOD AND APPARATUS, COMPUTER-READABLE STORAGE MEDIUM, AND COMPUTER DEVICE" and filed on Jul. 18, 2019. The entire disclosures of the prior applications are hereby incorporated by reference in their entirety.

FIELD OF THE TECHNOLOGY

This application relates to the field of computer technologies, including a gesture language recognition method and apparatus, a computer-readable storage medium, and a computer device.

BACKGROUND OF THE DISCLOSURE

For people with hearing impairment, gesture language such as sign language is a common natural language to express thoughts to others. However, ordinary people know little about the gesture language, making it difficult to communicate with people with hearing impairment. Therefore, the emergence of the gesture language recognition technology is of great significance, which can promote the communication between ordinary people and those with hearing impairment.

It is challenging to recognize a series of continuous gesture language expressions directly into words. In a related gesture language recognition solution, a bracelet or glove with sensors is used to obtain information such as distance and muscle activity, through which gesture language recognition is carried out. However, the accuracy of gesture language recognition is relatively low with the foregoing gesture language recognition solution.

SUMMARY

According to embodiments of this disclosure, a gesture language recognition method and apparatus, a non-transitory computer-readable storage medium, and a computer device are provided.

A gesture language recognition method is provided. In the method, a first video is obtained. Gesture features are extracted from frames of images in the first video. Gesture change features are extracted from the frames of the images in the first video. Gesture language word information is extracted from fused features that are determined based on the gesture features and the gesture change features. The gesture language word information is combined into a gesture language sentence according to context information corresponding to the gesture language word information.

A gesture language recognition apparatus is provided, including processing circuitry. The processing circuitry is configured to obtain a first video, and extract gesture features from frames of images in the first video. The processing circuitry is configured to extract gesture change features from the frames of the images in the first video, and extract gesture language word information from fused features that are determined based on the gesture features and the gesture change features. Further, the processing circuitry is configured to combine the gesture language word information into a gesture language sentence according to context information corresponding to the gesture language word information.

A non-transitory computer-readable storage medium is provided. The non-transitory computer-readable storage medium storing instructions which when executed by a processor cause the processor to perform the gesture language recognition method.

A computer device is provided, including a memory and a processor. The memory stores a computer program, the computer program, when executed by the processor, causing the processor to perform the gesture language recognition method.

Details of one or more embodiments of this disclosure are provided in the subsequent accompanying drawings and descriptions. Other features and advantages of this disclosure become obvious with reference to the specification, the accompanying drawings, and the claims.

BRIEF DESCRIPTION OF THE DRAWINGS

FIG. 6 is an exemplary schematic structural diagram of a feature extraction unit according to an embodiment.

FIG. 7 is an exemplary schematic flowchart of a step of extracting gesture language word information according to an embodiment.

DESCRIPTION OF EMBODIMENTS

To make objectives, technical solutions, and advantages of this disclosure clearer and more comprehensible, this disclosure is further elaborated in detail with reference to the accompanying drawings and embodiments. It is to be understood that the specific embodiments described herein are merely exemplary and used for explaining this disclosure but are not intended to limit the scope of this disclosure.

Figure 1:
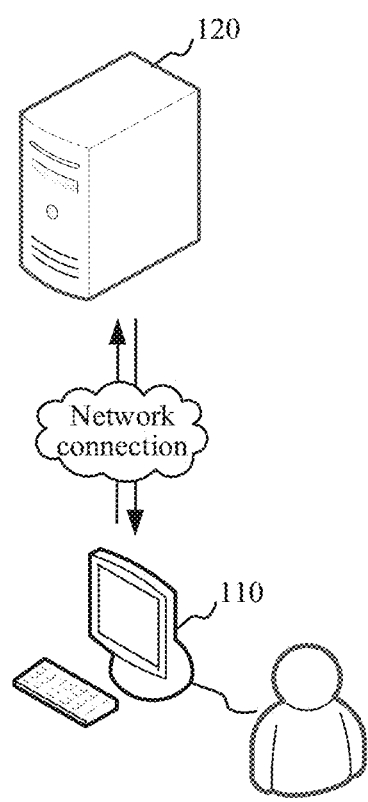
FIG. 1 is a diagram of an exemplary application environment of a gesture language recognition method according to an embodiment.

FIG. 1 is a diagram of an application environment of a gesture language recognition method according to an embodiment. Referring to FIG. 1, the gesture language recognition method is applied to a gesture language recognition system. The gesture language recognition system includes a terminal 110 and a server 120. The terminal 110 and the server 120 are connected through a network. The gesture language recognition method may be performed by the terminal 110, or may be performed by the terminal 110 and the server 120 collaboratively. When the method is performed by the terminal 110, the terminal 110 can obtain a to-be-recognized gesture language video; extract a gesture feature from each frame of an image in the gesture language video; extract a gesture change feature from each frame of an image in the gesture language video; extract gesture language word information from a fused feature obtained by fusing the gesture feature and the gesture change feature; and combine the gesture language word information into a gesture language sentence according to context information corresponding to the gesture language word information.

When the method is performed by the terminal 110 and the server 120 collaboratively, the terminal 110 can shoot images by using a built-in camera to further obtain a to-be-recognized gesture language video, and then transmit the gesture language video to the server 120. The server 120 can extract a gesture feature from each frame of an image in the gesture language video; extract a gesture change feature from each frame of an image in the gesture language video; extract gesture language word information from a fused feature obtained by fusing the gesture feature and the gesture change feature; and combine the gesture language word information into a gesture language sentence according to context information corresponding to the gesture language word information.

The terminal 110 may be specifically a desktop terminal or a mobile terminal. The mobile terminal may be specifically at least one of a mobile phone, a tablet computer, a notebook computer, and the like. Alternatively, the mobile terminal may be a specific gesture language translation machine, and the gesture language translation machine is installed with a camera, which is configured to record gesture language actions. The server 120 may be implemented by an independent server or a server cluster that includes a plurality of servers.

Figure 2:
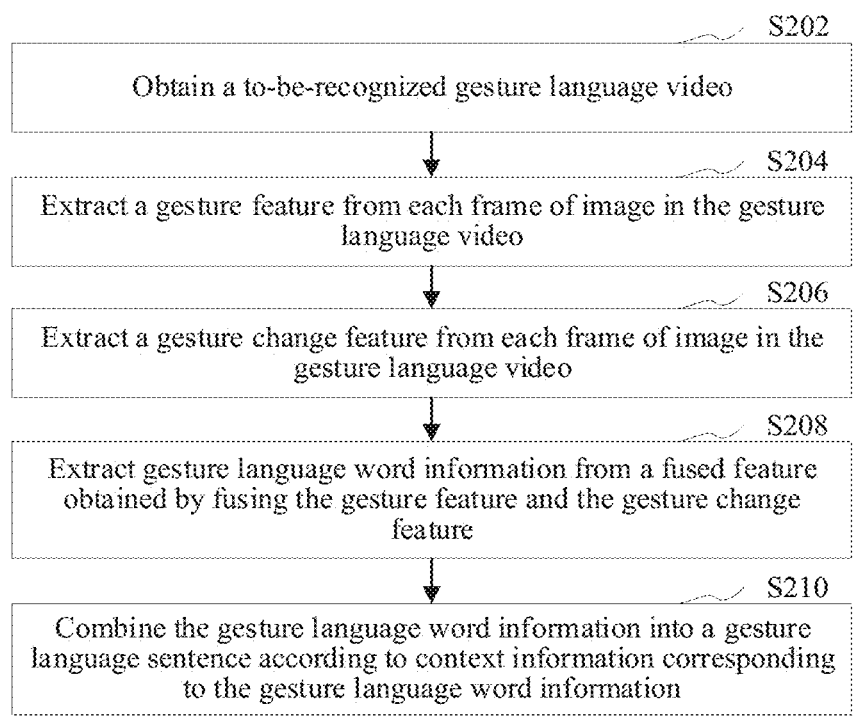
FIG. 2 is an exemplary schematic flowchart of a gesture language recognition method according to an embodiment.

As shown in FIG. 2, in an embodiment, a gesture language recognition method is provided. In this embodiment, the method being applied to the terminal 110 in FIG. 1 is used as an example for description mainly. Referring to FIG. 2, the gesture language recognition method can include the following steps.

In step S202, a plurality of images such as a to-be-recognized gesture language video is obtained.

The gesture language expresses thoughts by using hand movements and facial expressions to implement communication, and is a means by which people with hearing impairment and unable to speak (deaf) can communicate with each other and exchange thoughts. A gesture language video may be a video filmed when a target object (including people with hearing impairment, deaf, and normal people) communicates with other people or machines by using the gesture language, or when a user conveys information to other people (e.g., a journalist broadcasts news in a gesture language) by using the gesture language. A gesture language video includes a plurality of frames of images about the gesture language.

In an embodiment, when gesture language recognition is performed, a terminal starts a gesture language recognition client; and displays a gesture language recognition page after starting the gesture language recognition client, to perform corresponding operations and/or prompts according to the gesture language recognition page.

In an embodiment, the terminal detects a start operation triggered on the gesture language recognition page; and starts, in response to the start operation, a built-in camera to shoot frames of images. For example, the terminal shoots, by using the built-in camera, frames of images when a target object is using the gesture language, and combines the shot frames of images into a gesture language video. When detecting a stop operation triggered on the gesture language recognition page, the terminal turns off the built-in camera in response to the stop operation, to stop shooting frames of images.

For example, as shown in FIG. 3(a), when the user clicks a start button ⑤, a process of gesture language recognition is started, that is, frames of images about the gesture language are shot by using the built-in camera of the terminal. When the button ⑤ is clicked again, the process of gesture language recognition is stopped, that is, the shooting of frames of images is stopped.

Step S202 may be divided into the following two scenarios for description:

Scenario 1: Determine whether the gesture language pauses by detecting a waiting time, and obtain a gesture language video when the gesture language pauses.

In an embodiment, S202 may specifically include: the terminal films a target object in an environment when detecting a start operation; detects a waiting time of the target object in gesture changing in real time during filming when a video obtained by filming the target object includes a human face feature and a gesture feature; and uses the obtained video as the to-be-recognized gesture language video when the waiting time meets a preset condition.

In an embodiment, when the waiting time does not meet the preset condition, the terminal saves the video obtained by filming the target object, and returns to the operation of detecting a waiting time of the target object in gesture changing in real time during filming, until the waiting time meets the preset condition; and uses a current video obtained by filming the target object and the saved video as the to-be-recognized gesture language video.

The preset condition may be a time threshold, and when the waiting time is greater than or equal to the time threshold, it indicates that the waiting time meets the preset condition.

For example, when a gesture feature is detected, end point detection is performed, that is, whether a gesture language sentence is fully expressed is determined by determining whether the waiting time meets the preset condition. If the waiting time does not meet the preset condition, the frame of an image is stored. If the waiting time meets the preset condition, a frame of an image or video stored at a previous moment and a frame of an image shot currently are combined into a gesture language video.

Scenario 2: Determine whether the gesture language pauses by using end point detection, and obtain a gesture language video when the gesture language pauses.

In an embodiment, the method may further include: detecting, when a video obtained by filming a target object includes a human face feature and a gesture feature, a gesture feature of the target object in real time during filming; using the obtained video as the to-be-recognized gesture language video when the detected gesture feature meets a gesture end point condition; saving the filmed video when the detected gesture feature does not meet the gesture end point condition, and performing the operation of detecting a gesture feature of the target object in real time during filming, until the gesture feature meets the gesture end point condition; and using a current video obtained by filming the target object and the saved video as the to-be-recognized gesture language video.

For example, when a gesture feature is detected, end point detection is performed, and if the gesture is not the last gesture in a series of gestures, the frame of an image is stored. If a gesture end point is detected, a frame of an image or video stored at a previous moment and a frame of an image shot currently are combined into a gesture language video.

In an embodiment, when an image is obtained by filming a target object, the terminal detects a human face feature in the image to determine whether the image includes a human face feature. Then, when the image includes a human face feature, the terminal continues to detect a gesture feature in the image to determine whether the image includes a gesture feature. The terminal may detect a human face feature in the image by detecting human face feature points.

Figures 4, 5:
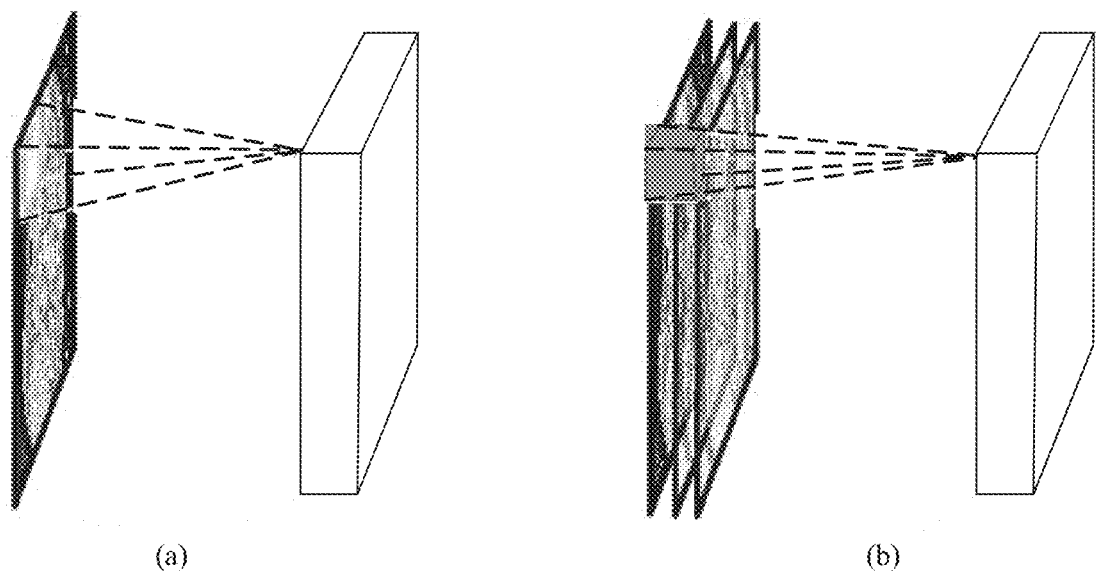
FIG. 4 is an exemplary schematic diagram of human face feature points according to an embodiment.
FIG. 5 is an exemplary schematic diagram of two-dimensional convolution and three-dimensional convolution according to an embodiment.

For example, as shown in FIG. 4, the human face feature may include face edge feature points denoted by 1 to 17, left eyebrow feature points and right eyebrow feature points of a user denoted by 18 to 22 and 23 to 27, nose feature points of the user denoted by 28 to 36, left eye feature points of the user denoted by 37 to 42, right eye feature points of the user denoted by 43 to 48, and lip feature points of the user denoted by 49 to 68. The foregoing is merely an example. In other embodiments, only some of the foregoing facial feature points or more feature points may be recognized, or the feature points may be marked in other manners. These all fall within the scope of the embodiments of this disclosure.

In an embodiment, when the video obtained by filming the target object includes the human face feature and the gesture feature, prompt information is displayed on the gesture language recognition page, and the prompt information may be a visual prompt or an auditory prompt. The visual prompt may be highlighted or may be a pop-up bar. The auditory prompt may be a voice prompt or an alarm. That a video includes a human face feature and a gesture feature may mean that each frame of an image in the video includes a human face feature and a gesture feature, and frames of images without a human face feature and/or a gesture feature are filtered out.

For example, as shown in FIG. 3(a), when the user clicks the start button ⑤, the terminal starts to perform the process of gesture language recognition, that is, the terminal films a target object by using a camera built in the terminal to obtain a video, and then detects whether each frame of an image in the video includes a human face feature. When a human face feature is detected, for example, as shown in FIG. 3(c), a video of FIG. 3(c) includes a human face feature, a human face detection result prompt box ① on a gesture language recognition page is highlighted to prompt the user that the video includes a human face feature. During filming, a head of the user may be not in a display screen, that is, not in a display region ⑦, and when a human face feature is not detected, for example, as shown in FIG. 3(b), a video in FIG. 3(b) does not include a human face feature, the box is not highlighted.

Then, the terminal continues to detect whether each frame of an image in the video includes a gesture feature. When a gesture feature is detected, for example, as shown in FIG. 3(c), the video in FIG. 3(c) includes a gesture feature in addition to the human face feature, a gesture detection result prompt box ② on the gesture language recognition page is highlighted to prompt the user that the video includes a gesture feature. When a gesture feature is not detected, for example, as shown in FIG. 3(a), the video in FIG. 3(a) includes a human face feature but does not include a gesture feature, the box is not highlighted.

In step S204, a gesture feature is extracted from each frame of an image in the gesture language video.

In an embodiment, the terminal performs two-dimensional convolution on each frame of an image in the gesture language video by using a two-dimensional network model, to extract a gesture feature in each frame of an image.

The two-dimensional network model may be a network model used for gesture feature extraction, and specifically may be a two-dimensional convolutional neural network model. The two-dimensional network model may be a network branch in a machine learning model.

In an embodiment, by using every three frames of images in the gesture language video as a window, the terminal may slide from the first frame to the last frame in the three frames of images at a stride of 1, and perform convolution on image blocks corresponding to the frames of images and a two-dimensional convolution kernel during sliding, as shown in FIG. 5(a). The foregoing convolution step may be performed for at least one time, so as to extract a gesture feature in each frame of an image. A size of the two-dimensional convolution kernel may be 3×3, and the stride is 1.

In step S206, a gesture change feature is extracted from each frame of an image in the gesture language video.

In an embodiment, the terminal performs three-dimensional convolution on each frame of an image in the gesture language video by using a three-dimensional network model, to extract a gesture change feature in each frame of an image.

The three-dimensional network model may be a network model used for gesture change feature extraction, and specifically may be a three-dimensional convolutional neural network model. The three-dimensional network model may be another network branch in the machine learning model.

In an embodiment, by using every three frames of images in the gesture language video as a window, the terminal may perform convolution on image blocks corresponding to the frames of images and a three-dimensional convolution kernel at a stride of 1. The foregoing convolution may be performed for at least one time, so as to extract a gesture change feature in each frame of an image. For example, as shown in FIG. 5(b), convolution is performed by using the three-dimensional convolution kernel and every three frames of images in the gesture language video to obtain a gesture change feature in each frame of an image. Because a time dimension is added to the three-dimensional convolution kernel, during feature extraction, a gesture change feature in the time dimension may be obtained. A size of the three-dimensional convolution kernel may be 3×3×3, and the stride is 1.

In step S208, gesture language word information is extracted from a fused feature obtained by fusing the gesture feature and the gesture change feature.

The gesture language word information is information used for representing a character or a word, and the information may be a word feature vector. The gesture language word information is extracted by using a long short-term memory network, and a regular term is introduced into a loss function of the long short-term memory network. An expression of the regular term is:

$$L_1 = -\sum_{n=1}^{N} P_{o,n} \log\left(\frac{P_{o,n}}{P_{c,n}}\right)$$

N is a total vocabulary, $P_{o,n}$ is a probability of occurrence of an $n^{th}$ word predicted during classification according to a sentence feature, and $P_{c,n}$ is a probability of occurrence of the $n^{th}$ word determined according to a word feature.

In an embodiment, the terminal fuses the gesture feature and the gesture change feature to obtain a fused feature. The step of fusing the gesture feature and the gesture change feature may specifically include: summing up the gesture feature and the gesture change feature and then averaging a result of the summing to obtain the fused feature.

The two-dimensional network model and the three-dimensional network model may jointly form a feature extraction unit, and the machine learning model may include at least four feature extraction units. In an embodiment, S204 may specifically include: extracting a gesture feature from each frame of an image in the gesture language video by using a two-dimensional network model in the first feature extraction unit. S206 may specifically include: extracting a gesture change feature from each frame of an image in the gesture language video by using a three-dimensional network model in the first feature extraction unit. Before S208, the method may further include: the terminal performs convolution and pooling on the fused feature between the gesture feature and the gesture change feature; extracts, by using a two-dimensional network model in the second feature extraction unit, a gesture feature from a fused feature obtained after the pooling; extracts, by using a three-dimensional network model in the second feature extraction unit, a gesture change feature from the fused feature obtained after the pooling; and fuses the extracted gesture feature and gesture change feature. By analogy, feature extraction is performed on corresponding fused features by using the third feature extraction unit and the fourth feature extraction unit successively to obtain a final fused feature.

For example, as shown in FIG. 6, the terminal performs convolution on each frame of an image in an inputted gesture language video by using a 2 dimension convolutional neural network (2D CNN) in the first feature extraction unit to obtain a gesture feature. A convolution kernel size of the 2D CNN is 7×7, a stride is 2, and a channel quantity is 64. In addition, the terminal performs convolution on each frame of an image in the inputted gesture language video by using a 3 dimension convolutional neural network (3D CNN) in the first feature extraction unit to obtain a gesture change feature. A convolution kernel size of the 3D CNN is 3×7×7, a stride is 2, and a channel quantity is 64. The terminal averages a sum of the gesture feature outputted by the 2D CNN and the gesture change feature outputted by the 3D CNN to obtain a fused feature of the first fusion. Then, the terminal performs convolution on the fused feature of the first fusion by using the 2D CNN with a convolution kernel size of 1×1, a stride of 1, and a channel quantity of 64, performs pooling by using a max pooling layer, and uses a fused feature obtained after the pooling as an input of the second feature extraction unit.

Then, the terminal performs convolution on the fused feature obtained after the pooling by using a 2D CNN in the second feature extraction unit to obtain a gesture feature. A convolution kernel size of the 2D CNN is 3×3, a stride is 1, and a channel quantity is 128. In addition, the terminal performs convolution on the fused feature obtained after the pooling by using a 3D CNN in the second feature extraction unit to obtain a gesture change feature. A convolution kernel size of the 3D CNN is 3×3×3, a stride is 1, and a channel quantity is 128. The terminal averages a sum of the gesture feature outputted by the 2D CNN in the second feature extraction unit and the gesture change feature outputted by the 3D CNN in the second feature extraction unit to obtain a fused feature of the second fusion. Then, the terminal performs convolution on the fused feature of the second fusion by using the 2D CNN with a convolution kernel size of 1×1, a stride of 1, and a channel quantity of 128, performs pooling by using the max pooling layer; and uses a fused feature obtained after the pooling as an input of the third feature extraction unit. By analogy, a final fused feature is obtained.

In step S210, the gesture language word information is combined into a gesture language sentence according to context information corresponding to the gesture language word information.

The context may refer to an environment corresponding to thoughts or emotions expressed when the gesture language is used. Alternatively, the context may be a relationship between a phrase segment and context.

In an embodiment, during gesture language recognition, the terminal may recognize a gesture in each frame of an image in the gesture language video by using a fuzzy matching manner, to obtain one or more pieces of corresponding gesture language word information. When a plurality of pieces of gesture language word information are obtained, the terminal may select gesture language word information corresponding to the context information from the plurality of pieces of gesture language word information, and then combine the selected gesture language word information into a gesture language sentence. One or more pieces of gesture language word information corresponding to the context information may be selected from the plurality of pieces of gesture language word information. The gesture language sentence may be a sentence in a text form, for example, "Welcome. Nice to meet you" shown in FIG. 3(c).

In an embodiment, in S210, the terminal performs information integration on all gesture language word information at a word level in two sequence directions by using at least one layer of bidirectional long short-term memory network. In this case, context information before and after is fully considered. Specifically, S210 includes: performing forward calculation and backward calculation on the gesture language word information; concatenating a sequence obtained through the forward calculation and a sequence obtained through the backward calculation to obtain a concatenated sequence; extracting a sentence feature from the concatenated sequence and performing classification according to the sentence feature; and synthesizing the gesture language sentence according to a result obtained through the classification.

The gesture language sentence is synthesized by using a bidirectional long short-term memory network; the bidirectional long short-term memory network adopts a connectionist temporal classification loss function; and the connectionist temporal classification loss function is configured to mark a gesture language word corresponding to a frame of an image including no gesture language word information as a null character, and delete the null character during synthesis of the gesture language sentence.

For example, gesture language word information including n characters is recorded as $x=(x_1, x_2, \ldots, x_n)$ and a sentence feature of the gesture language word information $x=(x_1, x_2, \ldots, x_n)$ is automatically extracted at a bidirectional long short-term memory network layer, that is, the gesture language word information $x=(x_1, x_2, \ldots, x_n)$ is used as an input of each time step of the bidirectional long short-term memory network layer; and then a hidden state sequence $(h_1\rightarrow, h_2\rightarrow, \ldots, h_n\rightarrow)$ outputted by a forward long short-term memory network layer and a hidden state sequence $(h_1\leftarrow, h_2\leftarrow, \ldots, h_n\leftarrow)$ outputted by a backward long short-term memory network layer are concatenated to obtain a complete hidden state sequence.

In the foregoing embodiment, when a gesture language video is obtained, a gesture feature in each frame of an image in the gesture language video is extracted, and a gesture change feature in each frame of an image in the gesture language video is also extracted, so as to obtain gesture information and gesture fine change information. When gesture language recognition is performed by using a gesture feature and a gesture change feature, the accuracy of the gesture language recognition can be effectively improved. Gesture language word information is extracted from a fused feature between the gesture feature and the gesture change feature, and when context information of the extracted gesture language word information is determined, the extracted gesture language word information is combined to form a gesture language sentence according to the context information, so that words are combined accurately and effectively, thereby helping improve the accuracy of the gesture language recognition.

In an embodiment, as shown in FIG. 7, S208 may specifically include the following steps:

In step S702, the fused feature obtained by fusing the gesture feature and the gesture change feature is converted into a feature vector.

In an embodiment, before S702, the terminal sums up the gesture feature to the gesture change feature, and averages a result of the summing to obtain the fused feature.

In an embodiment, S702 may specifically include: the terminal performs convolution on the fused feature obtained by fusing the gesture feature and the gesture change feature; and performs global average pooling on the fused feature after the convolution, to obtain a feature vector corresponding to each frame of an image in the gesture language video.

For example, as shown in FIG. 6, the terminal averages a sum of a gesture feature outputted by a 2D CNN in the fourth feature extraction unit and a gesture change feature outputted by a 3D CNN in the fourth feature extraction unit to obtain a fused feature of the fourth fusion. Then, the terminal performs convolution on the fused feature of the fourth fusion by using the 2D CNN with a convolution kernel size of 1×1, a stride of 1, and a channel quantity of 512, and performs pooling by using a global average pooling layer to obtain the feature vector corresponding to each frame of an image in the gesture language video.

In step S704, feature vectors, which correspond to a plurality of consecutive frames of images, among the feature vectors obtained through conversion are combined to obtain feature vector groups.

After the feature vectors corresponding to the plurality of consecutive frames of images are combined, a meta frame including a plurality of feature vectors may be obtained.

In an embodiment, the terminal first determines a quantity of vectors of each combination, and then combines the feature vectors corresponding to the plurality of consecutive frames of images according to the determined quantity of vectors.

For example, the quantity of vectors may be 12, and correspondingly, the meta frame may be formed by 12 feature vectors. Each feature vector corresponds to information of a corresponding frame of an image in an original gesture language video, and 12 feature vectors correspond to about 0.5 seconds of video playback time. Generally, a gesture language word usually lasts about 0.5 seconds, and therefore, each meta frame may represent a gesture language word.

In step S706, the gesture language word information is extracted from the feature vector groups respectively.

In an embodiment, after the feature vectors corresponding to the plurality of consecutive frames of images are combined, a feature vector group including a plurality of feature vectors is obtained, and the feature vector group is also referred to as a metal frame. The terminal extracts gesture language word information from each meta frame by using the long short-term memory network. For example, the terminal performs feature extraction at the word level on information in each meta frame by using the long short-term memory network to obtain a word feature. Each meta frame corresponds to a word feature (the word feature may be in the form of a word feature vector), and the word feature represents gesture language word information in the meta frame.

To make the model more general, an additional regular term can be introduced into the word level. Specifically, if a probability of occurrence of an $n^{th}$ word predicted during classification according to a sentence feature is $P_{o,n}$, and a probability of occurrence of the $n^{th}$ word determined according to a word feature is $P_{c,n}$, one term is added to the trained loss function:

$$L_1 = -\sum_{n=1}^{N} P_{o,n} \log\left(\frac{P_{o,n}}{P_{c,n}}\right)$$

N represents a total vocabulary.

In the foregoing embodiment, feature extraction at a word level is introduced, that is, a fused feature between a gesture feature and a gesture change feature is converted into a feature vector; then feature vectors corresponding to a plurality of consecutive frames of images are combined respectively to obtain feature vector groups, and gesture language word information is extracted from the feature vector groups respectively, so as to implement the feature extraction at the word level, thereby helping improve the accuracy of the gesture language recognition.

Figure 8:
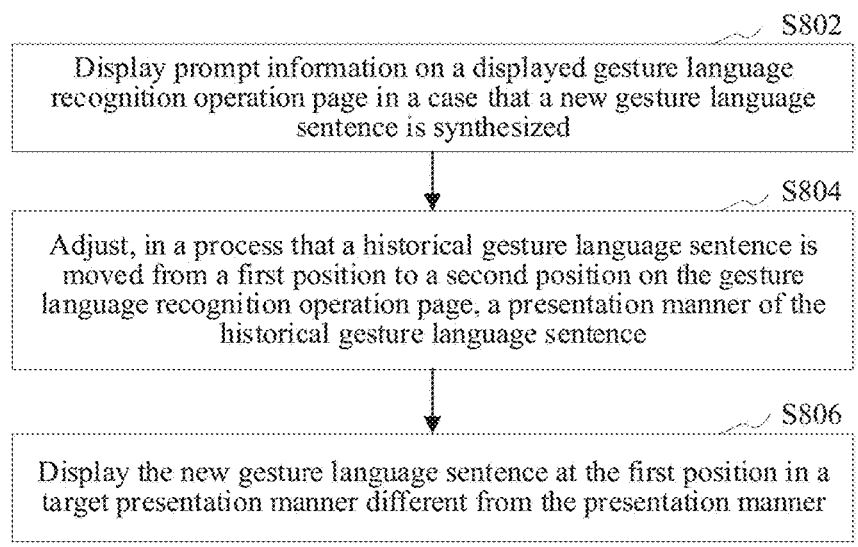
FIG. 8 is an exemplary schematic flowchart of a step of displaying prompt information when a new gesture language sentence is synthesized and displaying the new gesture language sentence in a preset presentation manner according to an embodiment.

In an embodiment, as shown in FIG. 8, the method may further include the following steps:

In step S802, prompt information is displayed on a displayed gesture language recognition operation page when a new gesture language sentence is synthesized.

The prompt information may be a visual prompt or an auditory prompt. The visual prompt may be highlighted or may be a pop-up bar. The auditory prompt may be a voice prompt or an alarm.

Figure 3:
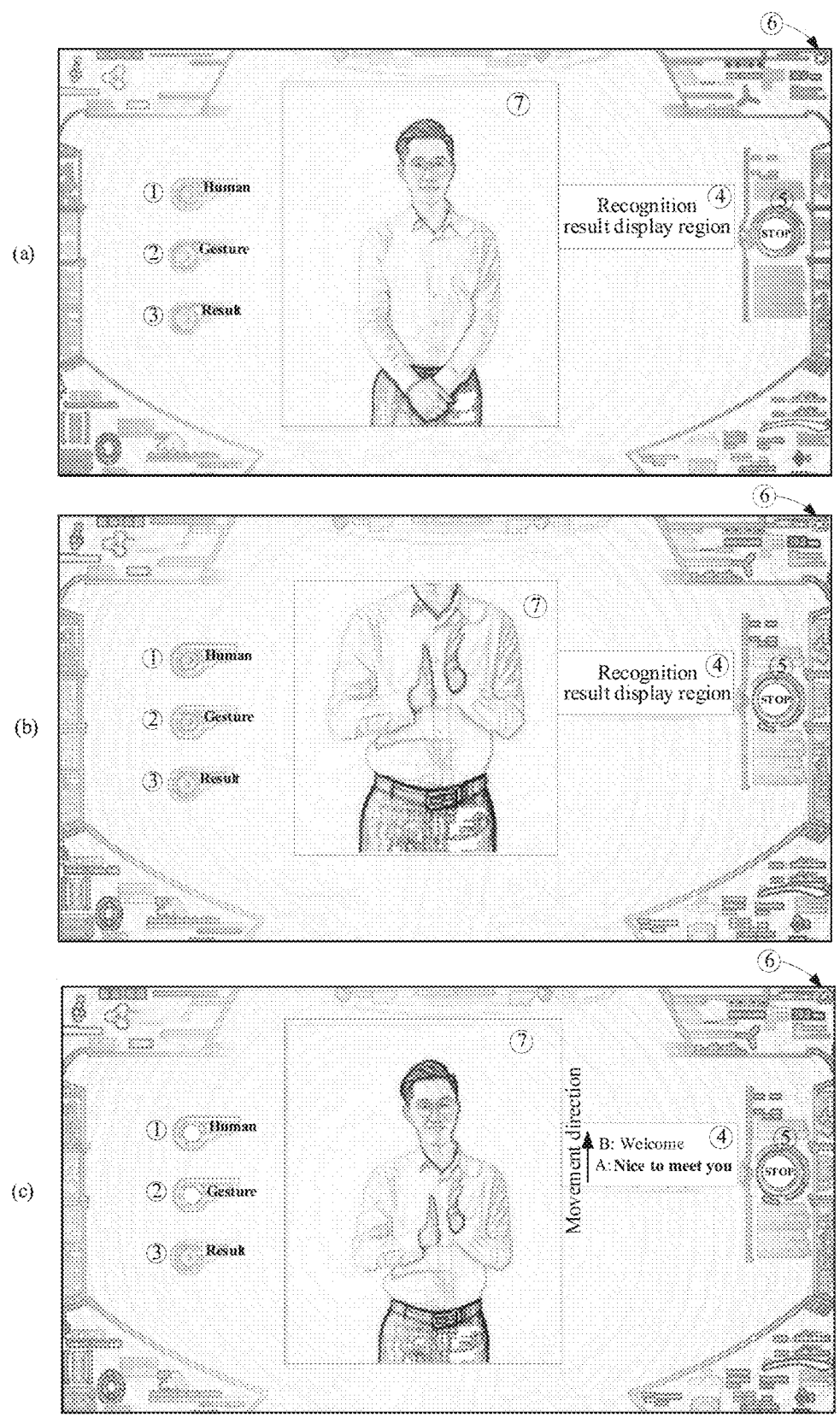
FIG. 3 is an exemplary schematic diagram of a gesture language recognition page according to an embodiment.

For example, as shown in FIG. 3(*c*), when a new gesture language sentence "nice (happy) to meet (see) you" is synthesized, a result prompt box ③ on the gesture language recognition page is highlighted to prompt the user that a new gesture language sentence is outputted; and when there is no synthesized new gesture language sentence, the box is not highlighted.

In step S804, in a process that a historical gesture language sentence is moved from a first position to a second position on the gesture language recognition operation page, a presentation manner of the historical gesture language sentence is adjusted.

The historical gesture language sentence is a gesture language sentence synthesized before the new gesture language sentence is synthesized. For example, a new gesture language sentence is synthesized at an $i^{th}$ second, and the historical gesture language sentence is a gesture language sentence synthesized between a $j^{th}$ second and the $i^{th}$ second (not including the $i^{th}$ second), i being a positive number, j being 0 or a positive number greater than 0, i>j. The presentation manner may represent a display form or a display state when a gesture language sentence is displayed. For example, the presentation manner may be to reduce a font size of the historical gesture language sentence, so that the font size of the moved historical gesture language sentence is reduced, or the presentation manner may be to adjust a font color of the historical gesture language sentence, so that a font color of the moved historical gesture language sentence is changed, or the presentation manner is a combination of the foregoing two manners.

In an embodiment, after a new gesture language sentence is synthesized, the terminal adjusts a historical gesture language sentence before the new gesture language sentence from the first position to the second position on the gesture language recognition operation page. For example, as shown in FIG. 3(c), in a recognition result display region ④, the historical gesture language sentence "welcome" is moved from a position A to a position B. During movement of the historical gesture language sentence, a font size of the historical gesture language sentence is reduced, that is, a font size of "welcome" is reduced, and in addition, the new gesture language sentence "nice to meet you" is displayed in bold at the position A. In the recognition result display region ④ shown in FIG. 3(c), the new gesture language sentence has the largest font size and is at the last row (i.e., the position A), and the region may reserve 3 results at most.

In step S806, the new gesture language sentence is displayed at the first position in a target presentation manner different from the presentation manner.

The target presentation manner may represent a display form or a display state when a gesture language sentence is displayed. For example, the target presentation manner may be to increase a font size of the new gesture language sentence, or to set the new gesture language sentence with a large font size, so that the font size of the displayed new gesture language sentence is larger than the font size of the displayed historical gesture language sentence.

In the foregoing embodiment, a display position and a presentation manner of the historical gesture language sentence are adjusted, and the new gesture language sentence is displayed at the first position in a target presentation manner different from the presentation manner, so that the new synthesized gesture language sentence is always presented at a particular position and is presented in a presentation manner different from that of the historical gesture language sentence, to distinguish the new gesture language sentence from the historical gesture language sentence, and to enable the user to notice the new gesture language sentence.

Figure 9:
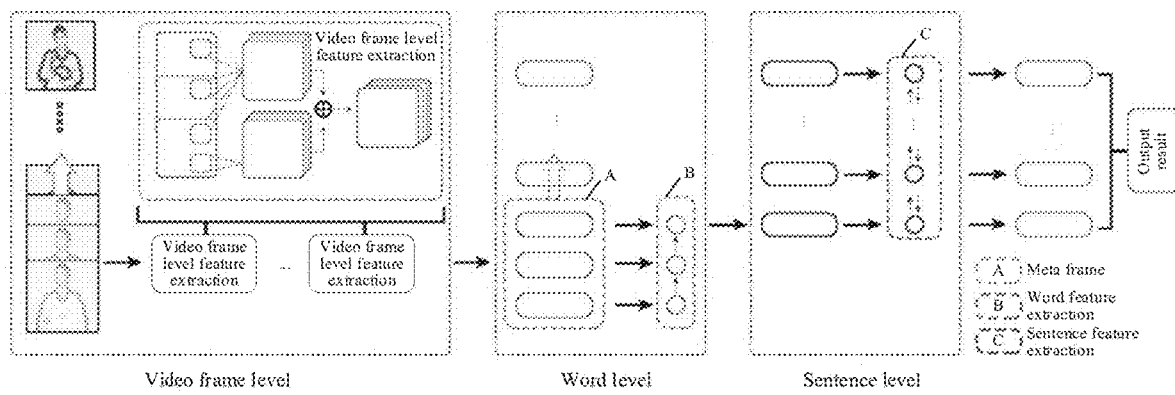
FIG. 9 is an exemplary structural block diagram of a machine learning model according to an embodiment.

In an example, a machine learning model based on structured feature learning and configured to recognize gesture language is provided in this embodiment. An overall framework diagram of the model is shown in FIG. 9, and the machine learning model includes three levels of networks: a video frame level, a word level, and a sentence level. Specifically:

(1) Video frame level: the machine learning model in this embodiment of this disclosure combines the 2D CNN and 3D CNN to perform feature extraction at the video frame level. In an embodiment, during the feature extraction at the video frame level, by using every three frames of images as a window, sliding is performed from the first frame to the last frame in three frames of images at a stride of 1. The three frames of images in each sliding window undergo two types of calculation, one is the 2D CNN with a convolution kernel of 3×3 and a stride of 1; and the other is the 3D CNN with a convolution kernel of 3×3×3 and a stride of 1. After the foregoing two types of calculation are performed, two groups of features with the same dimensions are obtained respectively, and finally, the two groups of features are summed and averaged to obtain a fused feature.

In an embodiment, the feature extraction at the video frame level may be formed by cascading a plurality of the 2D CNN units and 3D CNN units. There may be four or more cascaded modules, as shown in FIG. 6. A 2D CNN with a convolution kernel of 1×1 and a max pooling layer with a window size of 2×2 are inserted after each unit. At the end of the video frame level, each feature is compressed into a value by using a global average pooling layer. When the global average pooling layer has 512 channels in total, a feature vector with 512 elements is obtained corresponding to each frame of an image.

Feature information required for recognition can be fully extracted in an expression with extremely complex gesture language by using the unit formed by the 2D CNN and 3D CNN.

(2) Word level: in this embodiment of this disclosure, feature extraction at the word level is introduced into the machine learning model and a concept of meta frame is defined. Each meta frame includes 12 feature vectors, each feature vector corresponds to information of each frame of an image in an original gesture language video, and 12 feature vectors are approximately equal to 0.5 seconds of video playback time. Generally, a gesture language word usually lasts about 0.5 seconds, and therefore, each meta frame may represent a gesture language word.

In an embodiment, a long short-term memory network is introduced into the machine learning model and is configured to perform feature extraction at the word level on information in each meta frame. Finally, each meta frame generates a word feature (the word feature may be in the form of a word feature vector), and the word feature represents gesture language word information in the meta frame.

To make the model more general, an additional regular term is introduced into the word level. Specifically, if a probability of occurrence of an $n^{th}$ word in final classification probabilities in the gesture language video is $P_{o,n}$, and a probability of occurrence of the $n^{th}$ word determined according to a word feature is $P_{c,n}$, one term is added to the trained loss function:

$$L_1 = -\sum_{n=1}^{N} P_{o,n} \log\left(\frac{P_{o,n}}{P_{c,n}}\right)$$

N represents a total vocabulary.

(3) Sentence level: the sentence level is configured to integrate information of the word level. At the sentence level, a layer of bidirectional long short-term memory (Bi-LSTM) network is applied, and forward calculation and backward calculation are performed on all word features of the word level by using the Bi-LSTM network, so as to integrate information in two sequence directions. In this case, context information is fully considered. A series of sentence features are obtained by using the Bi-LSTM network, and the sentence features are used for classification and obtaining a final result (i.e., obtaining a corresponding gesture language sentence).

In an embodiment, a connectionist temporal classification (CTC) loss function is adopted during training. An additional "null" character is introduced into the CTC loss function, the character is deleted from the final output, and adjacent repeated outputs are also deleted finally.

Figure 10:
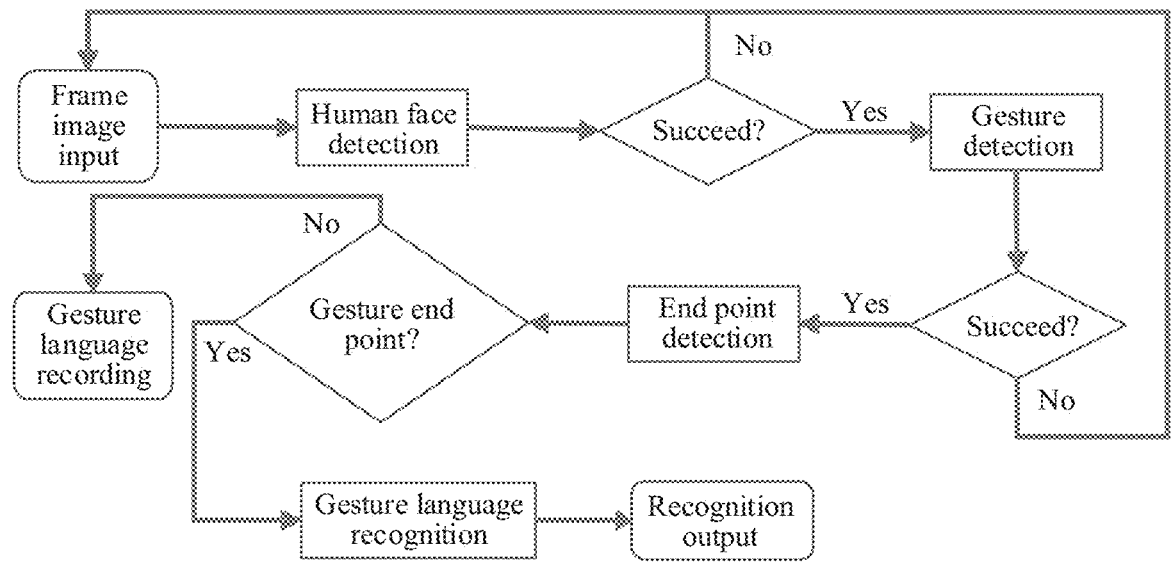
FIG. 10 is an exemplary schematic flowchart of a gesture language recognition method according to another embodiment.

In another embodiment, the machine learning model is applied to a terminal (e.g., a gesture language translation machine). In this case, the terminal may recognize gesture language. As shown in FIG. 10, steps of gesture language recognition can be performed as follows:

(1) Human face detection: when a gesture language video is filmed, human face feature detection is performed on each frame of an image in the gesture language video to determine whether there is a user in each frame of an image; and if there is no user, the frame of an image is skipped, and the step of filming is continued. If there is a user, a subsequent step of gesture detection is performed.

(2) Gesture detection: if a human face is detected, gesture detection is performed; and if no gesture is detected, the frame of an image is skipped, and the step of filming is continued. If there is a gesture, a subsequent step of end point detection is performed.

(3) End point detection: if a gesture is detected, end point detection is performed. If the gesture is not the last gesture in a series of gestures, the frame of an image is stored.

(4) Gesture language recognition: if a gesture end point is detected, the stored frame of an image and a currently filmed frame of an image are inputted into a machine learning model together, to further calculate a final recognition result.

Through the foregoing embodiment, the accuracy of the gesture language recognition may be effectively improved. Specifically, the accuracy of the gesture language recognition in a CSL dataset is 96.2% (the accuracy of related solutions is 89.0%), and the accuracy of the gesture language recognition in an RWTH dataset is 63.9% (the accuracy of related solutions is 61.7%).

The gesture language translation machine implemented by using the foregoing machine learning model can perform gesture language recognition by using a normal camera that records gesture language expressions, without any additional auxiliary device. Moreover, during gesture language expression, there is no need to pause or set a start or end gesture particularly, and the start or end gesture may be automatically recognized.

FIG. 2, FIG. 7, and FIG. 8 are schematic flowcharts of a gesture language recognition method according to an embodiment. It is to be understood that, although each step of the flowcharts in FIG. 2, FIG. 7, and FIG. 8 is displayed sequentially according to arrows, the steps are not necessarily performed according to an order indicated by arrows. Unless clearly specified in this specification, there is no strict sequence limitation on the execution of the steps, and the steps may be performed in another sequence. Moreover, at least part of the steps in FIG. 2, FIG. 7, and FIG. 8 may include a plurality of sub-steps or a plurality of stages. These sub-steps or stages are not necessarily executed at the same time, but can be executed at different times. The order of execution of these sub-steps or stages is not necessarily performed sequentially, but may be performed in turn or alternately with other steps or at least a part of sub-steps or stages of other steps.

Figure 11:
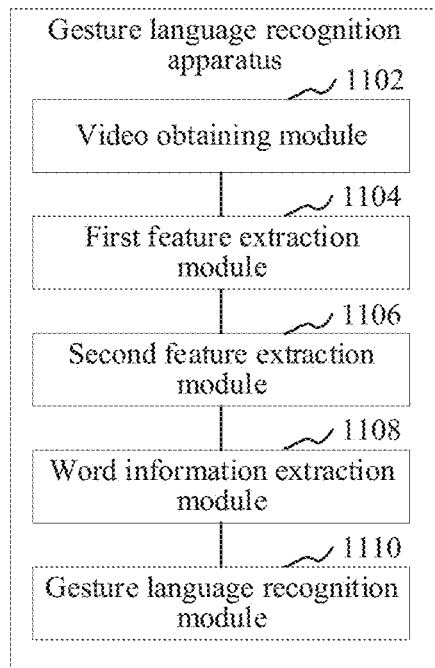
FIG. 11 is an exemplary structural block diagram of a gesture language recognition apparatus according to an embodiment.

As shown in FIG. 11, in an embodiment, a gesture language recognition apparatus is provided. The gesture language recognition apparatus can include: a video obtaining module 1102, a first feature extraction module 1104, a second feature extraction module 1106, a word information extraction module 1108, and a gesture language recognition module 1110. One or more of modules, submodules, and/or units of the apparatus can be implemented by processing circuitry, software, or a combination thereof, for example.

The video obtaining module 1102 is configured to obtain a to-be-recognized gesture language video.

The first feature extraction module 1104 is configured to extract a gesture feature from each frame of an image in the gesture language video.

The second feature extraction module 1106 is configured to extract a gesture change feature from each frame of an image in the gesture language video.

The word information extraction module 1108 is configured to extract gesture language word information from a fused feature obtained by fusing the gesture feature and the gesture change feature.

The gesture language recognition module 1110 is configured to combine the gesture language word information into a gesture language sentence according to context information corresponding to the gesture language word information.

In an embodiment, the video obtaining module 1102 is further configured to: film a target object in an environment; detect a waiting time of the target object in gesture changing in real time during filming when a video obtained by filming the target object includes a human face feature and a gesture feature; and use the obtained video as the to-be-recognized gesture language video when the waiting time meets a preset condition.

Figure 12:
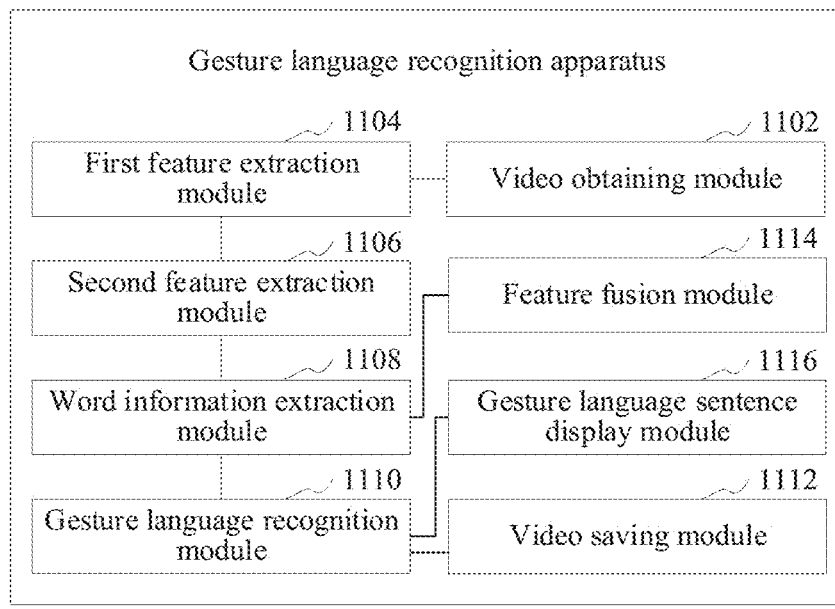
FIG. 12 is an exemplary structural block diagram of a gesture language recognition apparatus according to another embodiment.

In an embodiment, as shown in FIG. 12, the apparatus further includes a video saving module 1112.

The video saving module 1112 is configured to save, when the waiting time does not meet the preset condition, the video obtained by filming the target object, and return to the operation of detecting a waiting time of the target object in gesture changing in real time during filming, until the waiting time meets the preset condition.

The gesture language recognition module 1110 is further configured to use, when the waiting time meets the preset condition, a current video obtained by filming the target object and the saved video as the to-be-recognized gesture language video.

In an embodiment, the video obtaining module 1102 is further configured to detect, when a video obtained by filming a target object includes a human face feature and a gesture feature, a gesture feature of the target object in real time during filming; use the obtained video as the to-be-recognized gesture language video when the detected gesture feature meets a gesture end point condition; and save the filmed video when the detected gesture feature does not meet the gesture end point condition, and perform the operation of detecting a gesture feature of the target object in real time during filming, until the gesture feature meets the gesture end point condition.

The gesture language recognition module 1110 is further configured to use, when the gesture feature meets the gesture end point condition, a current video obtained by filming the target object and the saved video as the to-be-recognized gesture language video.

In an embodiment, the gesture feature is extracted by using a two-dimensional network model; and the gesture change feature is extracted by using a three-dimensional network model. As shown in FIG. 12, the apparatus further includes a feature fusion module 1114.

The feature fusion module 1114 is configured to perform, before the gesture language word information is extracted from the fused feature obtained by fusing the gesture feature and the gesture change feature, convolution and pooling on the fused feature between the gesture feature and the gesture change feature; extract, by using the two-dimensional network model, a gesture feature from a fused feature obtained after the pooling; extract, by using the three-dimensional network model, a gesture change feature from the fused feature obtained after the pooling; and fuse the extracted gesture feature and gesture change feature, and iterate the operation of performing convolution and pooling on the fused feature between the gesture feature and the gesture change feature for a preset quantity of times, to obtain a fused feature after the preset quantity of iterations.

In an embodiment, the gesture language recognition module 1110 is further configured to perform forward calculation and backward calculation on the gesture language word information; concatenate a sequence obtained through the forward calculation and a sequence obtained through the backward calculation to obtain a concatenated sequence; extract a sentence feature from the concatenated sequence and classifying according to the sentence feature; and synthesize the gesture language sentence according to a result obtained through the classification.

In an embodiment, the gesture language word information is extracted by using a long short-term memory network; a regular term is introduced into a loss function of the long short-term memory network; and the regular term is:

$$L_1 = -\sum_{n=1}^{N} P_{o,n} \log\left(\frac{P_{o,n}}{P_{c,n}}\right)$$

where N is a total vocabulary, $P_{o,n}$ is a probability of occurrence of an $n^{th}$ word predicted during classification according to a sentence feature, and $P_{c,n}$ is a probability of occurrence of the $n^{th}$ word determined according to a word feature.

In an embodiment, the gesture language sentence is synthesized by using a bidirectional long short-term memory network; the bidirectional long short-term memory network adopts a connectionist temporal classification loss function; and the connectionist temporal classification loss function is configured to mark a gesture language word corresponding to a frame of an image including no gesture language word information as a null character, and delete the null character during synthesis of the gesture language sentence.

In the foregoing embodiment, when a gesture language video is obtained, a gesture feature in each frame of an image in the gesture language video is extracted, and a gesture change feature in each frame of an image in the gesture language video is also extracted, so as to obtain gesture information and gesture fine change information. When gesture language recognition is performed by using a gesture feature and a gesture change feature, the accuracy of the gesture language recognition can be effectively improved. Gesture language word information is extracted from a fused feature between the gesture feature and the gesture change feature, and when context information of the extracted gesture language word information is determined, the extracted gesture language word information is combined to form a gesture language sentence according to the context information, so that words are combined accurately and effectively, thereby helping improve the accuracy of the gesture language recognition.

In an embodiment, the word information extraction module 1108 is further configured to convert the fused feature obtained by fusing the gesture feature and the gesture change feature into a feature vector; combine feature vectors, which correspond to a plurality of consecutive frames of images, among the feature vectors obtained through conversion to obtain feature vector groups; and extract the gesture language word information from the feature vector groups respectively.

In an embodiment, the word information extraction module 1108 is further configured to perform convolution on the fused feature obtained by fusing the gesture feature and the gesture change feature; and perform global average pooling on the fused feature after the convolution, to obtain a feature vector corresponding to each frame of an image in the gesture language video.

In the foregoing embodiment, feature extraction at a word level is introduced, that is, a fused feature between a gesture feature and a gesture change feature is converted into a feature vector; then feature vectors corresponding to a plurality of consecutive frames of images are combined respectively to obtain feature vector groups, and gesture language word information is extracted from the feature vector groups respectively, so as to implement the feature extraction at the word level, thereby helping improve the accuracy of the gesture language recognition.

In an embodiment, as shown in FIG. 12, the apparatus may further include a gesture language sentence display module 1116.

The gesture language sentence display module 1116 is configured to display prompt information on a displayed gesture language recognition operation page when a new gesture language sentence is synthesized; adjust, in a process that a historical gesture language sentence is moved from a first position to a second position on the gesture language recognition operation page, a presentation manner of the historical gesture language sentence, the historical gesture language sentence being a gesture language sentence synthesized before the new gesture language sentence is synthesized; and display the new gesture language sentence at the first position in a target presentation manner different from the presentation manner.

In the foregoing embodiment, a display position and a presentation manner of the historical gesture language sentence are adjusted, and the new gesture language sentence is displayed at the first position in a target presentation manner different from the presentation manner, so that the new synthesized gesture language sentence is always presented at a particular position and is presented in a presentation manner different from that of the historical gesture language sentence, to distinguish the new gesture language sentence from the historical gesture language sentence, and to enable the user to notice the new gesture language sentence.

Figure 13:
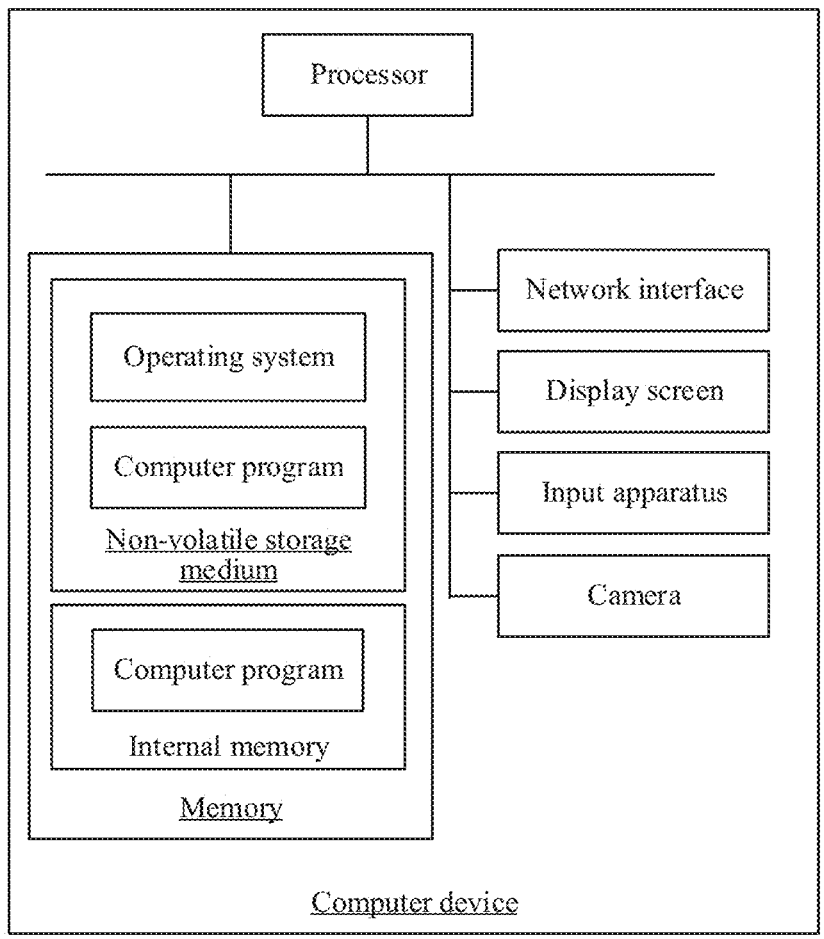
FIG. 13 is an exemplary structural block diagram of a computer device according to an embodiment.

FIG. 13 is a diagram of the internal structure of a computer device according to an embodiment. The computer device may be specifically the terminal 110 in FIG. 1. As shown in FIG. 13, the computer device includes a processor, a memory, a network interface, an input apparatus, and a display screen that are connected by a system bus.

The memory includes a non-volatile storage medium and an internal memory. The non-volatile storage medium of the computer device stores an operating system and may further store a computer program, the computer program, when executed by the processor, causing the processor to implement the gesture language recognition method. The internal memory may also store a computer program, the computer program, when executed by the processor, causing the processor to perform the gesture language recognition method. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

A person skilled in the art may understand that, the structure shown in FIG. 13 is only an exemplary block diagram of a part of a structure related to a solution of this disclosure and does not limit the computer device to which the solution of this disclosure is applied. Specifically, the computer device may include more or fewer components than those in the drawings, or some components are combined, or a different component deployment is used.

In an embodiment, the gesture language recognition apparatus provided in this disclosure may be implemented in a form of a computer program. The computer program may be run on the computer device shown in FIG. 11. The memory of the computer device may store program modules forming the gesture language recognition apparatus, for example, the video obtaining module 1102, the first feature extraction module 1104, the second feature extraction module 1106, the word information extraction module 1108, and the gesture language recognition module 1110 that are shown in FIG. 11. The computer program formed by the program modules causes the processor to perform the steps in the gesture language recognition method in the embodiments of this disclosure described in this specification.

For example, the computer device shown in FIG. 13 may perform S202 by using the video obtaining module 1102 in the gesture language recognition apparatus shown in FIG. 11. The computer device may perform S204 by using the first feature extraction module 1104. The computer device may perform S206 by using the second feature extraction module 1106. The computer device may perform S208 by using the word information extraction module 1108. The computer device may perform S210 by using the gesture language recognition module 1110.

In an embodiment, a computer device is provided, including a memory and a processor, the memory storing a computer program, the computer program, when executed by the processor, causing the processor to perform steps of the gesture language recognition method. Herein, the steps of the gesture language recognition method may be the steps of the gesture language recognition method in the foregoing embodiments.

In an embodiment, a computer-readable storage medium such as a non-transitory computer-readable storage medium is provided, storing a computer program, the computer program, when executed by a processor, causing the processor to perform the steps of the foregoing gesture language recognition method. Herein, the steps of the gesture language recognition method may be the steps of the gesture language recognition method in the foregoing embodiments.

A person of ordinary skill in the art may understand that all or some of procedures of the methods in the foregoing embodiments may be implemented by a computer program instructing relevant hardware. The program may be stored in a non-volatile computer-readable storage medium. When the program is executed, the procedures of the foregoing method embodiments may be included. References to the memory, the storage, the database, or other medium used in the embodiments provided in this disclosure may all include a non-volatile or a volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external cache. By way of description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a rambus direct RAM (RDRAM), a direct rambus dynamic RAM (DRDRAM), and a rambus dynamic RAM (RDRAM).

The technical features in the foregoing embodiments may be combined in other manners. For concise description, not all possible combinations of the technical features in the embodiments are described. However, provided that combinations of the technical features do not conflict with each other, the combinations of the technical features should be understood as falling within the scope described in this specification.

The foregoing embodiments only show several implementations of this disclosure, and descriptions thereof are in detail, but are not to be understood as a limitation to the patent scope of this disclosure. A person of ordinary skill in the art may further make variations and improvements without departing from the ideas of this disclosure, which all fall within the protection scope of this disclosure.

What is claimed is:

1. A gesture language recognition method, comprising:
   obtaining a first video;
   extracting gesture features from frames of images in the first video, each of the gesture features being extracted from a respective one of the frames based on a two-dimensional network model;
   extracting gesture change features from the frames of the images in the first video, each of the gesture change features being extracted from a respective one of the frames based on a three-dimensional network model;
   extracting gesture language word information from fused features that are determined based on the gesture features extracted based on the two-dimensional network model and the gesture change features extracted based on the three-dimensional network model; and
   combining, by processing circuitry, the gesture language word information into a gesture language sentence according to context information corresponding to the gesture language word information.

2. The method according to claim 1, wherein the obtaining the first video comprises:
   recording a target object in an environment;
   detecting a waiting time of the target object in gesture changing in during the recording when a second video obtained by the recording the target object includes a human face feature and the gesture features; and
   using the recorded second video as the first video when the waiting time meets a preset condition.

3. The method according to claim 2, wherein the method further comprises:

saving, when the waiting time does not meet the preset condition, the second video, and returning to the operation of detecting the waiting time of the target object in gesture changing in during the recording of a third video, until the waiting time meets the preset condition; and using the third video and the saved second video as the first video.

4. The method according to claim 1, wherein the method further comprises:

detecting, when a second video obtained by recording a target object includes a human face feature and the gesture features, the gesture features of the target object in during the recording;

using the second video as the first video when the detected gesture features meets a gesture end point condition;

saving the second video when the detected gesture features do not meet the gesture end point condition, and performing the operation of detecting the gesture features of the target object in during the recording, until the gesture features meet the gesture end point condition; and using a third video obtained by the recording the target object and the saved second video as the first video.

5. The method according to claim 1, wherein the method further comprises:

performing convolution and pooling successively on the fused features;

extracting, by using the two-dimensional network model, the gesture features from the fused features obtained after the pooling;

extracting, by using the three-dimensional network model, the gesture change features from the fused features obtained after the pooling; and fusing the extracted gesture features and the gesture change features, and iterating the operation of performing convolution and pooling on the fused features between the gesture features and the gesture change features for a preset quantity of times, to obtain the fused features after the preset quantity of times of iterations.

6. The method according to claim 1, wherein the extracting the gesture language word information comprises:

converting the fused features into feature vectors;

combining the feature vectors, which correspond to a plurality of consecutive frames of images, among the feature vectors obtained through the conversion to obtain feature vector groups; and extracting the gesture language word information from the feature vector groups respectively.

7. The method according to claim 6, wherein the converting the fused features comprises:

performing convolution on the fused features; and performing global average pooling on the fused features after the convolution, to obtain the feature vector corresponding to each frame of an image in the first video.

8. The method according to claim 1, wherein the combining the gesture language word information into the gesture language sentence comprises:

performing forward calculation and backward calculation on the gesture language word information;

concatenating a sequence obtained through the forward calculation and a sequence obtained through the backward calculation to obtain a concatenated sequence;

extracting a sentence feature from the concatenated sequence and performing classification according to the sentence feature; and synthesizing the gesture language sentence according to a result obtained through the classification.

9. The method according to claim 1, wherein the method further comprises:

displaying prompt information on a displayed gesture language recognition operation page when a new gesture language sentence is synthesized;

adjusting, in a process that a historical gesture language sentence is moved from a first position to a second position on the gesture language recognition operation page, a display characteristic of the historical gesture language sentence, the historical gesture language sentence being a gesture language sentence synthesized before the new gesture language sentence is synthesized; and displaying the new gesture language sentence at the first position with a target display characteristic that is different from the display characteristic of the historical gesture language sentence.

10. The method according to claim 1, wherein the gesture language word information is extracted by using a long short-term memory network; a regular term is introduced into a loss function of the long short-term memory network; and the regular term is:

$$L_1 = -\sum_{n=1}^{N} P_{o,n} \log\left(\frac{P_{o,n}}{P_{c,n}}\right)$$

wherein N is a total vocabulary, $P_{o,n}$ is a probability of occurrence of an $n^{th}$ word predicted during classification according to a sentence feature, and $P_{c,n}$ is a probability of occurrence of the $n^{th}$ word determined according to a word feature.

11. The method according to claim 10, wherein the gesture language sentence is synthesized by using a bidirectional long short-term memory network;

the bidirectional long short-term memory network adopts a connectionist temporal classification loss function; and the connectionist temporal classification loss function is configured to mark a gesture language word corresponding to a frame of image comprising no gesture language word information as a null character, and delete the null character during synthesis of the gesture language sentence.

12. A gesture language recognition apparatus, comprising:

processing circuitry configured to:

obtain a first video;

extract gesture features from frames of images in the first video, each of the gesture features being extracted from a respective one of the frames based on a two-dimensional convolutional network;

extract gesture change features from the frames of the images in the first video, each of the gesture change features being extracted from a respective one of the frames based on a three-dimensional convolutional network;

extract gesture language word information from fused features that are determined based on the gesture features extracted based on the two-dimensional network model and the gesture change features extracted based on the three-dimensional network model; and combine the gesture language word information into a gesture language sentence according to context information corresponding to the gesture language word information.

13. The apparatus according to claim 12, wherein the processing circuitry is configured to:

perform recording of a target object in an environment;

detect a waiting time of the target object in gesture changing in during the recording when a second video obtained by the recording the target object includes a human face feature and the gesture features; and use the recorded second video as the first video when the waiting time meets a preset condition.

14. The apparatus according to claim 13, wherein the processing circuitry is configured to:

save, when the waiting time does not meet the preset condition, the second video, and return to the operation of detecting the waiting time of the target object in gesture changing in during the recording of a third video, until the waiting time meets the preset condition; and using the third video and the saved second video as the first video.

15. The apparatus according to claim 12, wherein the processing circuitry is configured to:

detect, when a second video obtained by recording a target object includes a human face feature and the gesture features, the gesture features of the target object in during the recording;

use the second video as the first video when the detected gesture features meets a gesture end point condition;

save the second video when the detected gesture features do not meet the gesture end point condition, and perform the operation of detecting the gesture features of the target object in during the recording, until the gesture features meet the gesture end point condition; and use a third video obtained by the recording the target object and the saved second video as the first video.

16. The apparatus according to claim 12, wherein the processing circuitry is configured to:

perform convolution and pooling successively on the fused features;

extract, by using the two-dimensional network model, the gesture features from the fused features obtained after the pooling;

extract, by using the three-dimensional network model, the gesture change features from the fused features obtained after the pooling; and fuse the extracted gesture features and the gesture change features, and iterate the operation of performing convolution and pooling on the fused features between the gesture features and the gesture change features for a preset quantity of times, to obtain the fused features after the preset quantity of times of iterations.

17. The apparatus according to claim 12, wherein the processing circuitry is configured to:

convert the fused features into feature vectors;

combine the feature vectors, which correspond to a plurality of consecutive frames of images, among the feature vectors obtained through the conversion to obtain feature vector groups; and extract the gesture language word information from the feature vector groups respectively.

18. The apparatus according to claim 17, wherein the processing circuitry is configured to:

perform convolution on the fused features; and perform global average pooling on the fused features after the convolution, to obtain the feature vector corresponding to each frame of an image in the first video.

19. The apparatus according to claim 12, wherein the processing circuitry is configured to:

perform forward calculation and backward calculation on the gesture language word information;

concatenate a sequence obtained through the forward calculation and a sequence obtained through the backward calculation to obtain a concatenated sequence;

extract a sentence feature from the concatenated sequence and perform classification according to the sentence feature; and synthesize the gesture language sentence according to a result obtained through the classification.

20. A non-transitory computer-readable storage medium storing instructions which when executed by a processor cause the processor to perform:

obtaining a first video;

extracting gesture features from frames of images in the first video, each of the gesture features being extracted from a respective one of the frames based on a two-dimensional network model;

extracting gesture change features from the frames of the images in the first video, each of the gesture change features being extracted from a respective one of the frames based on a three-dimensional network model;

extracting gesture language word information from fused features that are determined based on the gesture features extracted based on the two-dimensional network model and the gesture change features extracted based on the three-dimensional network model; and combining the gesture language word information into a gesture language sentence according to context information corresponding to the gesture language word information.

* * * * *